(12) United States Patent
Tomicic et al.

(10) Patent No.: US 12,210,719 B2
(45) Date of Patent: Jan. 28, 2025

(54) GAMING SYSTEM AND GAMING SYSTEM PROCESSOR MODULE

(71) Applicant: Aristocrat Technologies Australia Pty Limited, North Ryde (AU)

(72) Inventors: Zoran Tomicic, Woronora (AU); Drazen Lenger, Rushcutters Bay (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 97 days.

(21) Appl. No.: 18/305,232

(22) Filed: Apr. 21, 2023

(65) Prior Publication Data

US 2023/0266855 A1  Aug. 24, 2023

Related U.S. Application Data

(63) Continuation of application No. 17/701,474, filed on Mar. 22, 2022, now Pat. No. 11,662,873, which is a continuation of application No. 16/884,800, filed on May 27, 2020, now Pat. No. 11,281,350, which is a continuation of application No. 16/809,254, filed on
(Continued)

(30) Foreign Application Priority Data

Oct. 9, 2008 (AU) .................... 2008905247

(51) Int. Cl.
*A63F 13/23* (2014.01)
*G06F 3/048* (2013.01)
*G07F 17/32* (2006.01)

(52) U.S. Cl.
CPC .............. *G06F 3/048* (2013.01); *A63F 13/23* (2014.09); *G07F 17/32* (2013.01); *G07F 17/3202* (2013.01)

(58) Field of Classification Search
CPC ................................ G07F 17/32; A63F 13/23
See application file for complete search history.

(56) References Cited

U.S. PATENT DOCUMENTS

| 5,277,424 A | 1/1994 | Wilms |
| 5,805,790 A | 9/1998 | Nota |
(Continued)

FOREIGN PATENT DOCUMENTS

| AU | 2008200148 B2 | 1/2010 |
| AU | 2005239694 B2 | 5/2011 |
(Continued)

OTHER PUBLICATIONS

Definition of Hypervisor <https://www.webopedia.com/TERM/H/hypervisor.html> Feb. 3, 2008.
(Continued)

*Primary Examiner* — James S. McClellan
(74) *Attorney, Agent, or Firm* — Armstrong Teasdale LLP (57) ABSTRACT

A gaming system and processor module are therefore adapted to support simultaneous execution of two or more operating system instances. Program code is provided for play of the game uses two or more cooperating component processes partitioned such that at least one of the component processes executes using a first operating system instance, and at least one other cooperating component process executes using a further operating system instance. Each operating system instance may execute in its own virtual machine.

20 Claims, 7 Drawing Sheets

Related U.S. Application Data

Mar. 4, 2020, now Pat. No. 11,249,612, which is a continuation of application No. 14/824,738, filed on Aug. 12, 2015, now Pat. No. 10,592,060, which is a continuation of application No. 12/575,960, filed on Oct. 8, 2009, now abandoned.

(56) References Cited

U.S. PATENT DOCUMENTS

| | | |
|---|---|---|
| 6,496,847 B1 | 12/2002 | Bugnion |
| 6,519,594 B1 | 2/2003 | Li |
| 7,022,017 B1 | 4/2006 | Halbritter |
| 7,337,219 B1 | 2/2008 | Meenan |
| 7,351,151 B1 | 4/2008 | Crowder, Jr. |
| 7,356,677 B1 | 4/2008 | Rafizadeh |
| 7,865,893 B1 | 1/2011 | Omelyanchuk |
| 2002/0052230 A1 | 5/2002 | Martinek |
| 2003/0069074 A1 | 4/2003 | Jackson |
| 2003/0110173 A1 | 6/2003 | Marsland |
| 2003/0224858 A1 | 12/2003 | Yoseloff |
| 2004/0002381 A1 | 1/2004 | Alcorn |
| 2004/0198479 A1 | 10/2004 | Martinek |
| 2004/0215702 A1 | 10/2004 | Hamasaki |
| 2005/0010738 A1 | 1/2005 | Stockdale |
| 2005/0096133 A1 | 5/2005 | Hoefelmeyer |
| 2005/0170893 A1 | 8/2005 | Muir |
| 2005/0181875 A1 | 8/2005 | Hoehne |
| 2005/0223219 A1 | 10/2005 | Gatto |
| 2005/0239694 A1 | 10/2005 | Tomas |
| 2006/0005187 A1 | 1/2006 | Neil |
| 2006/0122937 A1 | 6/2006 | Gatto |
| 2006/0137015 A1 | 6/2006 | Fahrny |
| 2006/0259292 A1 | 11/2006 | Solomon |
| 2006/0264256 A1 | 11/2006 | Gagner |
| 2006/0281556 A1 | 12/2006 | Solomon |
| 2006/0287108 A1 | 12/2006 | Canterbury |
| 2006/0288200 A1 | 12/2006 | Morrow |
| 2007/0004501 A1 | 1/2007 | Brewer |
| 2007/0021196 A1 | 1/2007 | Campbell |
| 2007/0129150 A1 | 6/2007 | Crowder |
| 2007/0129151 A1 | 6/2007 | Crowder |
| 2007/0150937 A1 | 6/2007 | Gatto |
| 2007/0165856 A1 | 7/2007 | Sylla |
| 2007/0178970 A1 | 8/2007 | Lemay |
| 2007/0234355 A1 | 10/2007 | Locker |
| 2007/0243937 A1 | 10/2007 | Hernandez |
| 2007/0267816 A1 | 11/2007 | Goodman |
| 2007/0270213 A1 | 11/2007 | Nguyen |
| 2007/0287540 A1 | 12/2007 | Kiran |
| 2008/0009337 A1 | 1/2008 | Jackson |
| 2008/0010517 A1 | 1/2008 | Locker |
| 2008/0028400 A1 | 1/2008 | Taillefer |
| 2008/0045342 A1 | 2/2008 | Crowder, Jr. |
| 2008/0058097 A1 | 3/2008 | Martinek |
| 2008/0064501 A1 | 3/2008 | Patel |
| 2008/0082985 A1 | 4/2008 | Gagner |
| 2008/0132331 A1 | 6/2008 | Gatto |
| 2008/0155536 A1 | 6/2008 | Levit-Gurevich |
| 2008/0163239 A1 | 7/2008 | Sugumar |
| 2008/0168479 A1 | 7/2008 | Purtell |
| 2008/0234047 A1 | 9/2008 | Nguyen |
| 2008/0244598 A1 | 10/2008 | Tolopka |
| 2008/0254856 A1 | 10/2008 | Yoshizawa |
| 2009/0083630 A1 | 3/2009 | Peterson |
| 2009/0248949 A1 | 10/2009 | Khatri |
| 2009/0275407 A1* | 11/2009 | Singh .................. G07F 17/3223 718/1 |
| 2009/0313406 A1 | 12/2009 | Suh |
| 2010/0041470 A1 | 2/2010 | Preisach |
| 2010/0093433 A1 | 4/2010 | Tomicic |
| 2010/0257599 A1 | 10/2010 | Gleichauf |

FOREIGN PATENT DOCUMENTS

| | | |
|---|---|---|
| CA | 2319600 A1 | 3/2001 |
| CA | 2539351 A1 | 12/2006 |
| CA | 2566786 A1 | 5/2007 |
| CA | 2548924 A1 | 11/2007 |
| CA | 2593336 A1 | 1/2008 |
| CA | 2528796 C | 12/2014 |
| CN | 101065170 B | 8/2012 |
| EP | 1467282 A2 | 10/2004 |
| EP | 1890231 A3 | 8/2008 |
| EP | 1467282 B1 | 10/2008 |
| EP | 1255234 B1 | 7/2009 |
| EP | 1868128 A3 | 8/2012 |
| GB | 2372622 B | 9/2004 |
| GB | 2402349 B | 3/2007 |
| GB | 2421819 B | 5/2009 |
| JP | 2007152057 A | 6/2007 |
| JP | 2007236724 A | 9/2007 |
| JP | 2007260085 A | 10/2007 |
| JP | 2007260086 A | 10/2007 |
| KR | 20020010559 | 2/2002 |
| KR | 20020088058 | 11/2002 |
| KR | 20030077084 | 10/2003 |
| KR | 20030079315 | 10/2003 |
| KR | 20030091264 | 12/2003 |
| KR | 20050005317 | 1/2005 |
| NZ | 509020 A | 1/2003 |
| SG | 136965 A1 | 11/2007 |
| WO | 9530944 | 11/1995 |
| WO | 1999061121 A1 | 12/1999 |
| WO | 2000052572 A1 | 9/2000 |
| WO | 0154025 | 7/2001 |
| WO | 0177982 | 10/2001 |
| WO | 0250664 A2 | 6/2002 |
| WO | 02073501 | 9/2002 |
| WO | 2004004855 A1 | 1/2004 |
| WO | 2004061615 A3 | 8/2005 |
| WO | 2006027488 A1 | 3/2006 |
| WO | 2006072942 A2 | 7/2006 |
| WO | 2006119070 A1 | 11/2006 |
| WO | 2005110565 A3 | 12/2006 |
| WO | 2006128019 A3 | 2/2007 |
| WO | 2007013970 A1 | 2/2007 |
| WO | 2007030472 A2 | 3/2007 |
| WO | 2007032916 A1 | 3/2007 |
| WO | 2006072942 A3 | 6/2007 |
| WO | 2006127109 A3 | 6/2007 |
| WO | 2007024512 A3 | 9/2007 |
| WO | 2007104935 A1 | 9/2007 |
| WO | 2007095402 A3 | 12/2007 |
| WO | 2007078654 A3 | 1/2008 |
| WO | 2008018874 A1 | 2/2008 |
| WO | 2008016610 A3 | 5/2008 |
| WO | 2008051844 A2 | 5/2008 |
| WO | 2007133468 A3 | 10/2008 |
| WO | 2007145954 A3 | 11/2008 |
| ZA | 200402744 A | 12/2004 |

OTHER PUBLICATIONS

"Non-Final Office Action", issued in connection with U.S. Appl. No. 12/575,960, dated Oct. 12, 2011 (13 pages).

"Final Office Action", issued in connection with U.S. Appl. No. 12/575,960, dated Jun. 7, 2012 (14 pages).

"Non-Final Office Action", issued in connection with U.S. Appl. No. 12/575,960, dated Apr. 18, 2014 (15 pages).

"Final Office Action", issued in connection with U.S. Appl. No. 12/575,960, dated Feb. 12, 2015 (14 pages).

Office Action (Non-Final Rejection) dated Aug. 5, 2021 for U.S. Appl. No. 16/943,764 (pp. 1-7).

Office Action (Notice of Allowance and Fees Due (PTOL-85)) dated Nov. 26, 2021 for U.S. Appl. No. 16/943,764 (pp. 1-5).

Office Action (Notice of Allowance and Fees Due (PTOL-85)) dated Oct. 6, 2021 for U.S. Appl. No. 16/809,254 (pp. 1-8).

Office Action (Notice of Allowance and Fees Due (PTOL-85)) dated Nov. 12, 2021 for U.S. Appl. No. 16/884,800 (pp. 1-8).

(56) References Cited

OTHER PUBLICATIONS

Office Action (Notice of Allowance and Fees Due (PTOL-85)) dated Mar. 9, 2022 for U.S. Appl. No. 16/943,772 (pp. 1-8).
Office Action (Notice of Allowance and Fees Due (PTOL-85)) dated Apr. 15, 2022 for U.S. Appl. No. 16/943,772 (pp. 1-2).
Office Action (Notice of Allowance and Fees Due (PTOL-85)) dated Jan. 24, 2023 for U.S. Appl. No. 17/701,474 (pp. 1-8).

* cited by examiner

GAMING SYSTEM AND GAMING SYSTEM PROCESSOR MODULE

CROSS-REFERENCE TO RELATED APPLICATIONS

The present application is a continuation of U.S. patent application Ser. No. 17/701,474, filed Mar. 22, 2022, entitled "GAMING SYSTEM AND GAMING SYSTEM PROCESSOR MODULE," which is a continuation of U.S. patent application Ser. No. 16/884,800, filed May 27, 2020, entitled "GAMING SYSTEM AND GAMING SYSTEM PROCESSOR MODULE," which is a continuation of U.S. patent application Ser. No. 16/809,254, filed on Mar. 4, 2020, entitled "GAMING SYSTEM AND GAMING SYSTEM PROCESSOR MODULE," which is a continuation of U.S. patent application Ser. No. 14/824,738, filed on Aug. 12, 2015, entitled "GAMING SYSTEM AND GAMING SYSTEM PROCESSOR MODULE," which is a continuation of U.S. patent application Ser. No. 12/575,960, filed on Oct. 8, 2009, entitled "GAMING SYSTEM AND GAMING SYSTEM PROCESSOR MODULE," which claims the benefit of priority to Australian Provisional Patent Application No. 2008905247, filed on Oct. 9, 2008, entitled "GAMING SYSTEM and GAMING SYSTEM PROCESSOR MODULE," which is herein incorporated by reference in its entirety.

FIELD

The present invention relates to gaming systems and processor modules therefore.

BACKGROUND

Electronic gaming machines and gaming systems incorporating one or more electronic gaming machines are known. Such gaming machines and systems are used to provide games, playable by users for their enjoyment.

While such gaming systems provide users with enjoyment, a need exists for alternative gaming systems.

SUMMARY OF THE INVENTION

According to a first aspect, there is provided a gaming system processor module adapted to support simultaneous execution of two or more operating system instances to thereby enable execution of program code which enables play of a game, whereby execution of the program code uses two or more cooperating component processes partitioned such that at least one of the component processes executes using a first operating system instance, and at least one other cooperating component process executes using a further operating system instance.

The gaming system processor module can have a virtual machine monitor to support the simultaneous execution of two or more operating system instances, wherein each operating system instance executes in its own virtual machine. The processor module may include one or more physical processors. Each processor can have one or more processing cores.

In some embodiments each operating system instance can be selectively provided with direct access to one or more hardware resources. Any hardware resource access provided to an operating system instance can be exclusive to the operating system instance.

In an embodiment a first operating system instance acts as a host operating system and each further operating system instance acts as a guest operating system, and wherein access to hardware resources is allocated selectively to guest operating system instances under control of the host operating system.

The host operating system instance can be adapted to monitor the guest operating system instances and selectively restart a guest operating system instance, if necessary, when an execution error is detected in the guest operating system instance.

In one embodiment, component processes related to game play execute in a first operating system instance and component processes related to game presentation execute in a second guest operating system instance.

In some embodiments the first and second operating system instances each execute a different type of operating system. For example, the first operating system type can be a LINUX operating system or variant thereof. The second guest operating system can be a Microsoft Windows operating system.

Alternatively each operating system instance can execute the same type of operating system.

In an embodiment component processes executed using the second guest operating system include game graphics component processes. In this embodiment the second guest operating system may be provided access to game system hardware resources for displaying game graphics.

According to a second aspect, there is provided a gaming system including:
- a player interface arranged to enable a player to enter instructions to play a game and including one or more displays to display game results; and
- a game controller in data communication with the player interface, the game controller including:
  - a memory; and
  - an electronic processing arrangement adapted to support simultaneous execution of two or more operating system instances to thereby enable execution of program code which enables play of a game, whereby execution of the program code uses two or more cooperating component processes partitioned such that at least one of the component processes executes using a first operating system instance, and at least one other cooperating component process executes using a further operating system instance.

According to a third aspect, there is provided a game controller including:
- a memory; and
- an electronic processing arrangement adapted to support simultaneous execution of two or more operating system instances to thereby enable execution of program code which enables play of a game, whereby execution of the program code uses two or more cooperating component processes partitioned such that at least one of the component processes executes using a first operating system instance, and at least one other cooperating component process executes using a further operating system instance.

According to a fourth aspect, there is provided a program including computer readable instructions which when executed by a processor module of a game system adapt the processor module to support simultaneous execution of two or more operating system instances, to thereby enable execution of program code which enables play of a game, and execution of a the program code uses two or more cooperating component processes partitioned such that at least one of the component processes executes using a first operating system instance, and at least one other cooperating component process executes using a further operating system instance.

According to a fifth aspect, there is provided a method of gaming including the steps of:
providing program code which enables play of a game, wherein execution of the program code uses two or more cooperating component processes;
executing at least one of the component processes using a first operating system instance; and
executing at least one other cooperating component process using a further operating system instance, wherein the execution of the component processes in the first and further operating systems cooperates to implement the game.

The method can further include the step of selectively providing direct hardware access to each operating system instance.

In an embodiment the component processes executed in the first operating system are component processes for implementing game play and component processes executed the further operating system instance are component processes for game presentation.

According to a sixth aspect there is provided a computer readable medium including the above program code.

According to a seventh aspect there is provided a data signal including the above program code.

An eighth aspect provides transmitting and receiving the above data signal.

BRIEF DESCRIPTION OF DRAWINGS

Certain exemplary embodiments of the invention will now be described with reference to the accompanying drawings in which.

Features, further aspects, and advantages of the present invention will become apparent from the following description of embodiments thereof, by way of example only, with reference to the accompanying drawings. Also, various embodiments of the aspects described in the preceding paragraphs will be apparent from the appended claims, the following description and/or the accompanying drawings. It should be understood, however, that the present invention is not limited to the arrangements and instrumentality shown in the attached drawings.

DETAILED DESCRIPTION

Although the following discloses example methods, systems, articles of manufacture, and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, systems, articles of manufacture, and apparatus, the examples provided are not the only way to implement such methods, systems, articles of manufacture, and apparatus.

When any of the appended claims are read to cover a purely software and/or firmware implementation, in at least one embodiment, at least one of the elements is hereby expressly defined to include a tangible medium such as a memory, DVD, CD, etc. storing the software and/or firmware.

Referring to the drawings, there is shown a gaming system having a game controller with an electronic processing arrangement adapted to support simultaneous execution of two or more operating system instances. The game controller is arranged to implement a game using to or more component software processes wherein at least one component process is executes using a first operating system instance and at least one other component process executed using a further operating system instance.

The gaming system can take a number of different forms. In a first form, a stand alone gaming machine is provided wherein all or most components to implement the game are present in a player operable gaming machine.

In a second form, a distributed architecture is provided wherein some of the components to implement the game are present in a player operable gaming machine and some of the components to implement the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Figure 1:
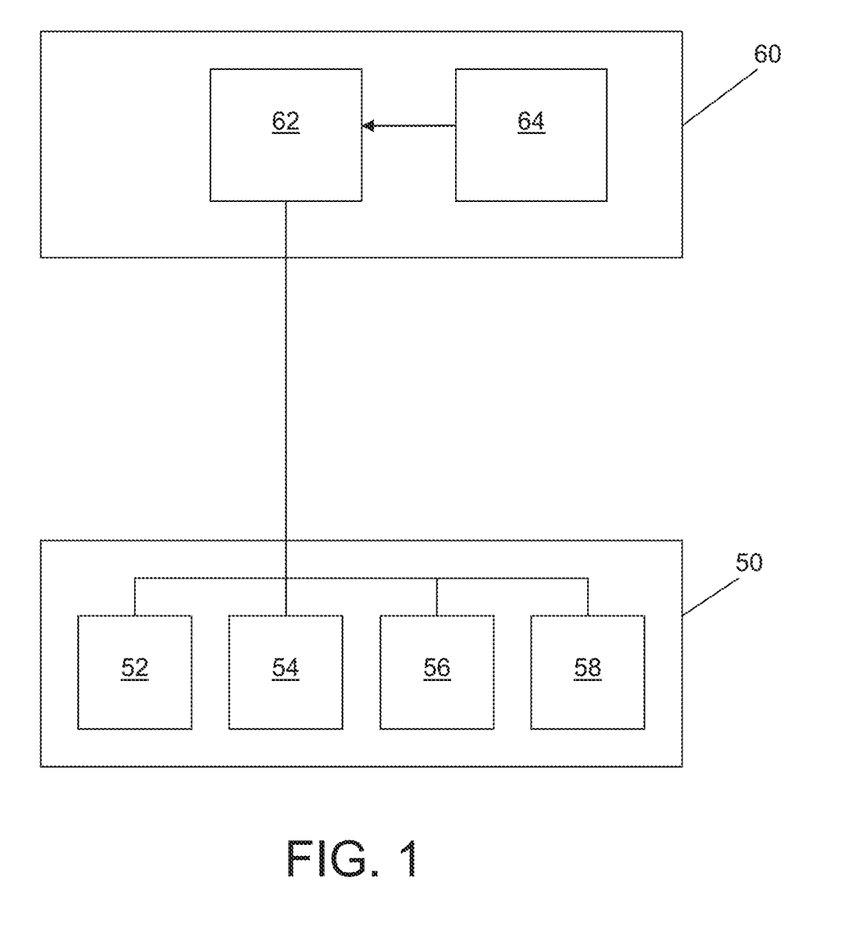
FIG. 1 is a block diagram of the core components of a gaming system.

Irrespective of the form, the gaming system includes several core components. At the broadest level, the core components are a player interface 50 and a game controller 60 as illustrated in FIG. 1. The player interface is arranged to enable manual interaction between a player and the gaming system and for this purpose includes the input/output components for the player to enter instructions and play the game and observe the game outcomes.

Components of the player interface may vary from embodiment to embodiment but will typically include a credit mechanism 52 to enable a player to input credits and receive payouts, one or more displays 54, a game play mechanism 56 including one or more input devices that enable a player to input game play instructions (e.g. to place betas wager), and one or more speakers 58.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
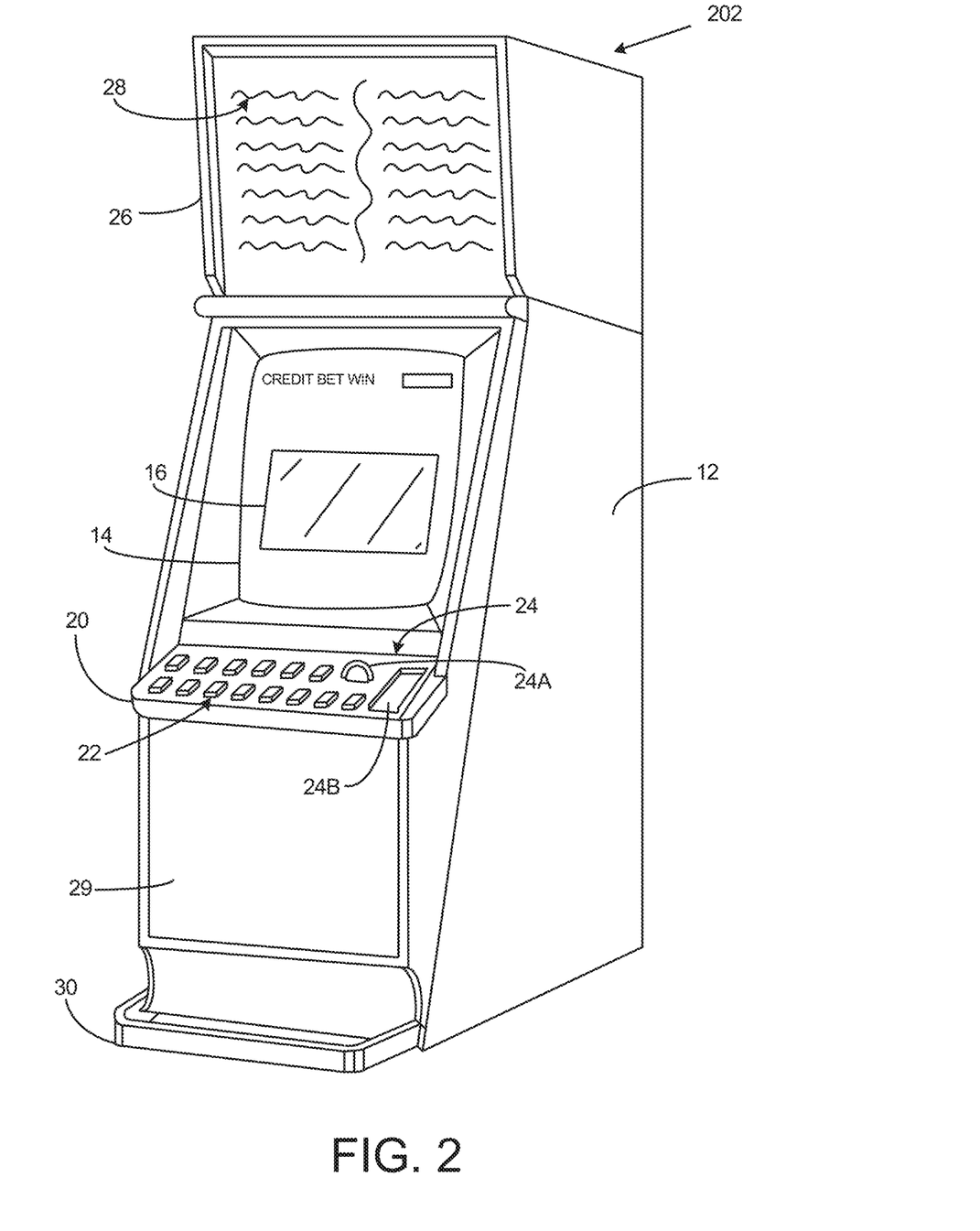
FIG. 2 is a perspective view of a stand alone gaming machine.

A gaming system in the form of a stand alone gaming machine 202 is illustrated in FIG. 2. The gaming machine 202 includes a console 12 having a display 14 on which are displayed representations of a game 16 that can be played by a player. A mid-trim 20 of the gaming machine 202 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may configure for ticket in such that they have a ticket reader for reading tickets having a value and crediting the player based on the face value of the ticket. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 202.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
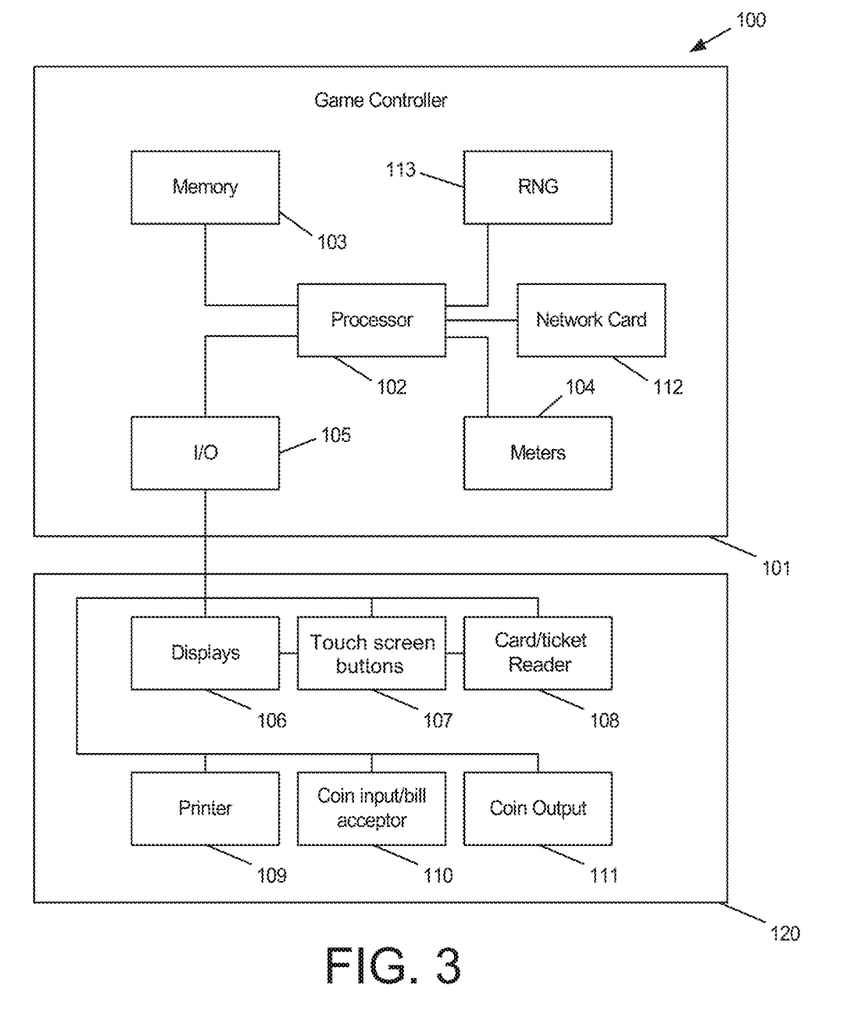
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 include one or more displays 106, a touch screen and/or buttons 107, speakers or audio output (not shown), a card and/or ticket reader 108, a printer 109, a bill acceptor and/or coin input mechanism 110 and a coin output mechanism 111. Additional hardware may be included as part of the gaming machine 100, or hardware may be omitted based on the specific implementation. For example, while buttons or touch screens are typically used in gaming machines to allow a player to place a wager and initiate a play of a game any input device that enables the player to input game play instructions may be used. For example, in some gaming machines a mechanical handle is used to initiate a play of the game.

In addition, the gaming machine 100 may include a communications interface, for example a network card 112. The network card may, for example, send status information, accounting information or other information to a central controller, server or database and receive data or commands from the central controller, server or database. In embodiments employing a player marketing module, communications over a network may be via player marketing module—i.e. the player marketing module may be in data communication with one or more of the above devices and communicate with it on behalf of the gaming machine.

Figure 4:
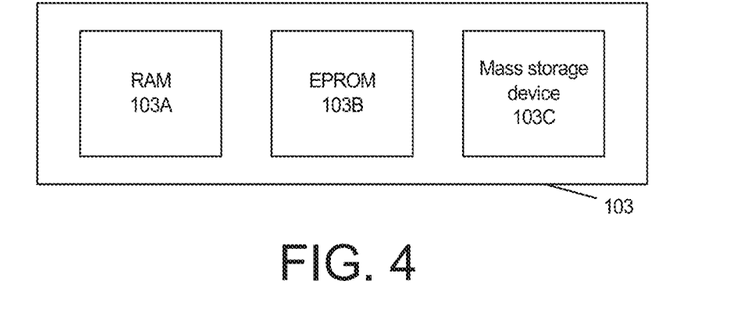
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
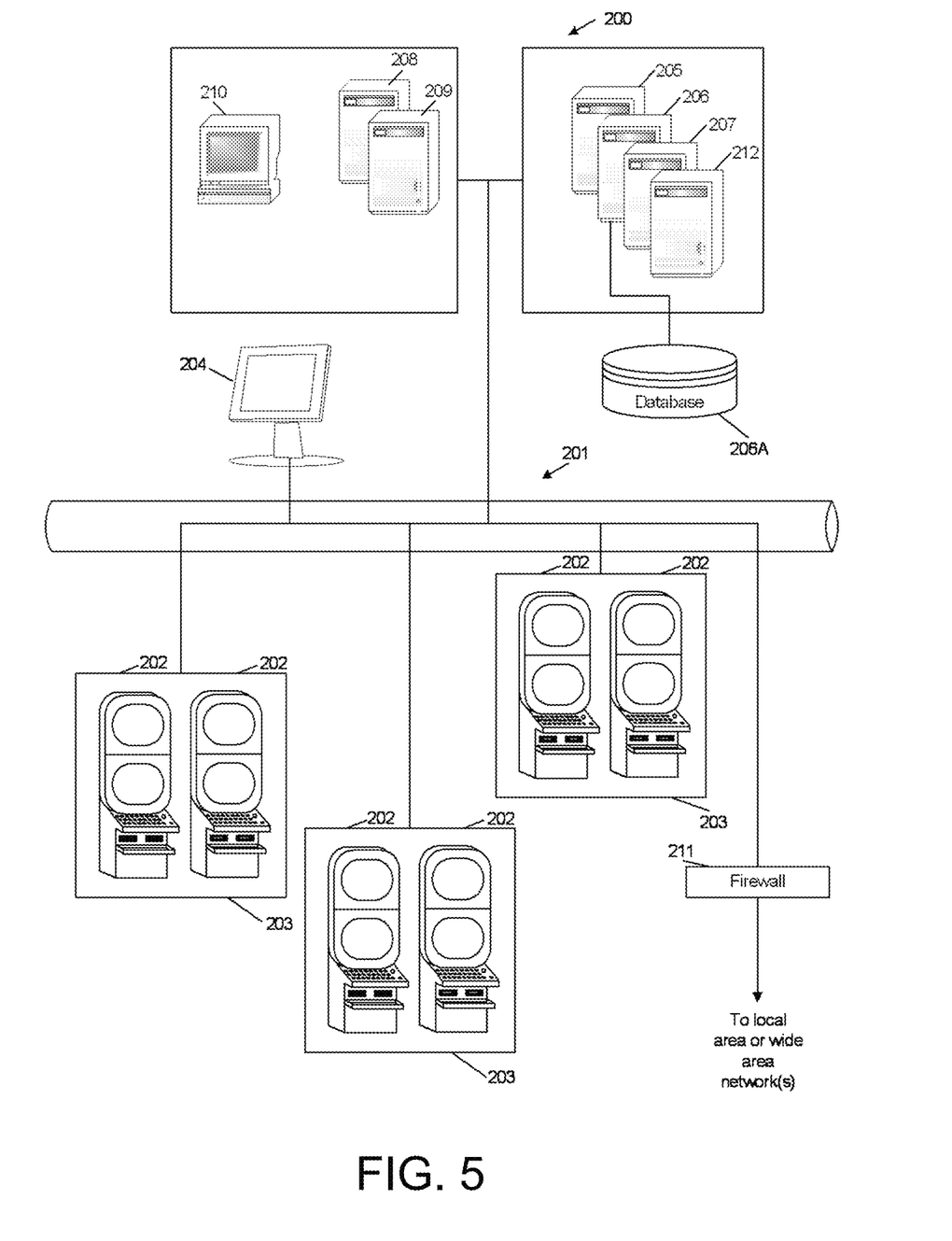
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements, guidelines, rules, and/or preferences for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games based on the terminals.

Embodiments of the gaming system described in detail herein use an electronic processing arrangement adapted to support simultaneous execution of two or more operating system instances. Games can be implemented in this system using two or more cooperating component processes such that at least one component process executes using a first operating system instance and one or more other component processes execute using a further operating system instance. Thus, game execution is partitioned such that cooperating component processes execute using different operating system instances.

Each of the operating system instances may be a different operating system type. For example the first operating system may be a LINUX operating system and a second operating system may be a Microsoft Windows® operating system. Each operating system instance may be selectively provided direct access to one or more hardware resources. Other operating system types may also be used.

Figure 6:
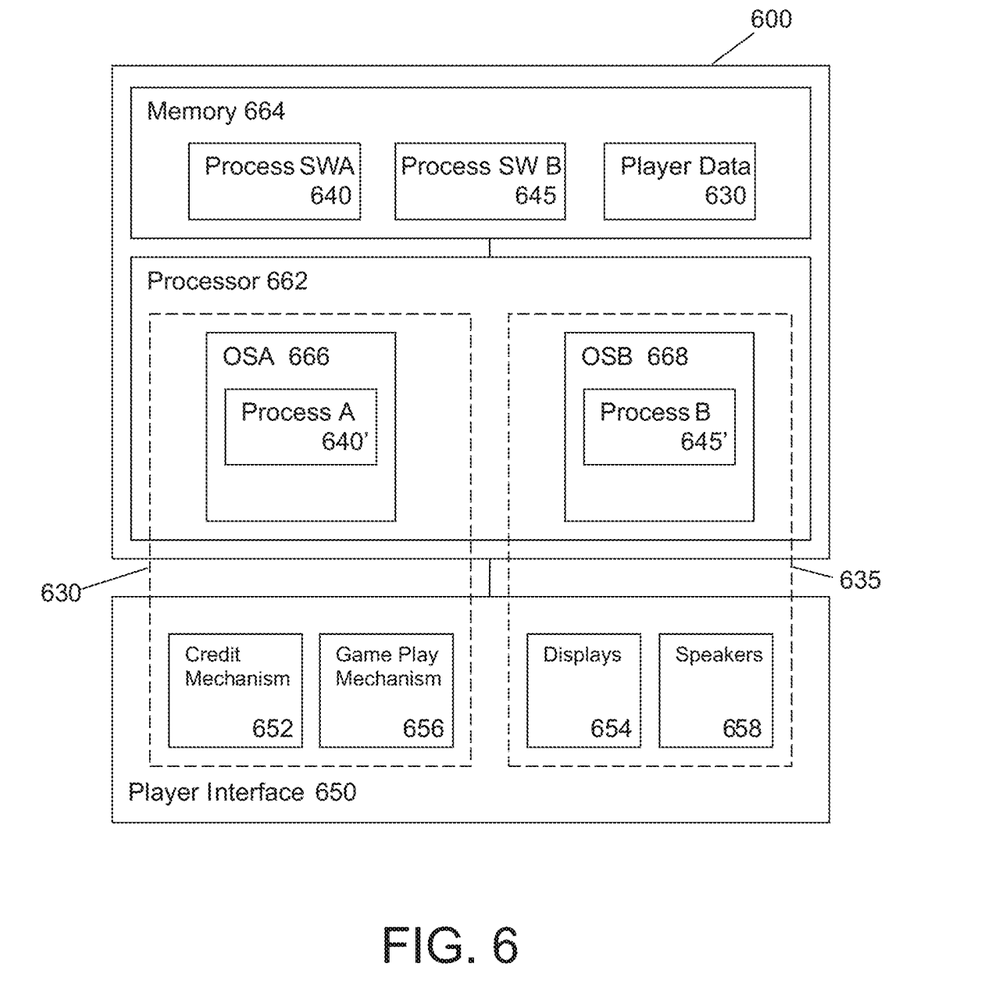
FIG. 6 is a further block diagram of a gaming system.

An example of an embodiment of a stand alone game machine having a processor adapted to support two or more operating systems simultaneously is illustrated in FIG. 6. The game machine 600 includes a game controller 660 and a player interface 650. The player interface 650 includes a credit mechanism 652, displays 654, a game play mechanism 656 and speakers 658. The controller 660 includes a processor 662 and memory 664.

In this embodiment the memory 664 stores game data including software programs for two or more component processes 640, 645 which, when executed, implement the game. The processor 662 is adapted to support two or more operating system instances. The processor 662 can be a processor module, such as a central processor unit (CPU) having one or more physical processors, or an electronic processing arrangement including one or more physical processors. The electronic processing arrangement may be centralised in one processor module. Alternatively the electronic processing arrangement may be distributed, for example where two or more CPUs are connected in a multi processor environment. The processors may be single or multi-core processors.

In the example illustrated the processor 662 is running two operating system instances 666, 668. A first component process executes 640' in the first operating system 666 and a second component process executes 645' in the second operating system 668. Using two or more operating system instances enables different processes to execute independently of one another. In the embodiment illustrated in FIG. 6, access to hardware resources can be selectively allocated to different operating systems. In this example, the first operating system 666 is used for executing game play processes 640' and is therefore allocated access to hardware resources for the credit mechanism 652 and game play mechanism 656 of the player interface 650. The second operating system 668 is used for executing component processes for game presentation 645' and is therefore allocated access to hardware resources for the displays 654 and speakers 658 of the player interface 650.

As illustrated the execution of game processes and hardware access is separated into two partitions 630, 635 with the first partition 630 being for game play and the second partition 635 being for game presentation. Allocation of hardware resources separately to each partition is optional. In an alternative embodiment only one operating system instance is provided direct access to hardware resources.

Partitioning of game component process execution using different operating system instances can exhibit a number of advantages. For example, in some embodiments partitioning can enhance security by separating player account and credit handling from other game processes. For example, resistance to hacking of player accounts may be increased by quarantining player account and credit handling from processing of inputs from the player interface other than the credit mechanism. In some embodiments one operating system instance can be used for providing the game machine platform and another one or more operating systems used for execution of the game per se, for example the platform operating system instance may handle all I/O and mathematical functions and the one or more operating system instances for implementing the game handle execution of the game play process and presentation. This can minimise risk of interference or timing delay for the mathematical functions due to processing of other aspects of game play or presentation, such as playing animated graphics. Interference or security risks can be even further mitigated in embodiments where access to hardware resources can be selectively allocated to different operating system instances.

In some embodiments the two or more component processes can be adapted to execute in different operating system types or versions. This can be advantageous for portability or compatibility of games between different machines. Further, partitioning games into cooperating component processes adapted to execute in different operating systems enables a game to be designed and implements in a modular fashion. This has the advantage of enabling component processes to be selectively modified or upgraded, for example for compatibility with different hardware or selectively upgrading different elements of the game such as the game graphics.

Producing a game in this modular fashion may also be advantageous for obtaining regulatory approval of games initially and in the case of upgrades. For example, game play component processes which deal with credit handling, game outcome generation, random number generation, player tracking etc. could be adapted to execute using one operating system instance. The component processes for game presentation, such as graphics and sound can be adapted to execute in another operating system instance. Game data, such as game outcome data, can be provided to the game presentation component processes of one operating system instance by game execution component processes of the other operating system instance. This data can be passed between the two operating system instances using a data transfer protocol or signal. However, the game presentation component process cannot influence game play due to the operating system separation. Thus, the requirement for regulatory approval of the game presentation component processes may be different and less strict than the regulatory approval requirements for the game play processes. For example, this can have significant advantages where the same game play process is used for two or more types of game machines which each have different game presentation capabilities, for example different displays and different graphics processing abilities. The game play process may be granted regulatory approval and then each of the sets of game presentation component processes assessed and approved individually. Further, regulatory approval may be straightforward and readily obtained where only the presentation of a game is changed, for example changing a game theme from a circus to a seaside theme, without altering the actual game play process.

Figure 7:
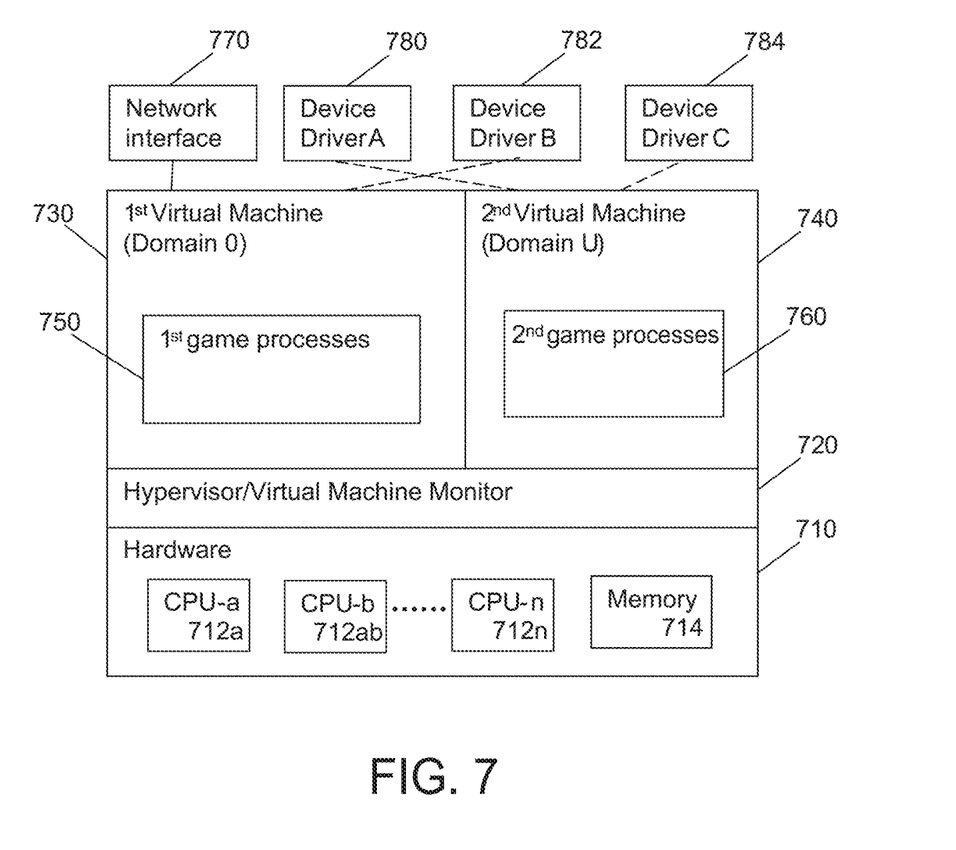
FIG. 7 is a block diagram representative of an exemplary architecture for a gaming processor.

As illustrated in FIG. 7, a virtual machine monitor or hypervisor 720 is provided to enable execution of multiple virtual machines on the same physical processor hardware 710, this can be referred to as virtualisation or paravirtualisation. The physical hardware 710 may include one or more central processor units (CPUs) 712*a-n* and a variety of memory resources 714. In the architecture of the embodiment illustrated, the virtual machine monitor (VMM) 720 is a basic abstraction layer of software that sits directly on the hardware 710 below any operating systems 730, 740. The VMM performs scheduling of process execution across the physical hardware 710, including scheduling across multiple processors 712*a-n* and processor cores in the case of multi-core processors. The VMM also abstracts the hardware to define the virtual machines for the various operating systems. Thus the virtual machine hardware architecture apparent and accessible to the operating system executing within that machine may be different from the actual physical hardware architecture. It should be appreciated that the sophistication of the VMM used may place constraints on the physical hardware architecture which may be used. Further, the sophistication of the VMM will also determine the flexibility of the abstraction of hardware to the different virtual machines. For example, a simple VMM may only be able to operate in a single processor hardware environment. The abstracted hardware for each virtual machine may be an image of the physical processor hardware and hardware peripherals only visible to one virtual machine. Alternatively a sophisticated VMM may be capable of operating in a multi processor environment and enable different abstracted hardware architectures for each virtual machine.

The VMM 720 of FIG. 7 operates at the lowest and most privileged layer in the architecture. The VMM 720 can host multiple guest operating systems (OS), each executing within a secure virtual machine 730, 740. The VMM 720 is responsible for processing scheduling and memory partitioning of the various virtual machines running on the same physical hardware 710. The VMM 720 abstracts the hardware for the virtual machines 730, 740 and controls the execution of the virtual machines 730, 740 which share a common hardware processing environment 710. The operating system running in each virtual machine may be a modified or unmodified version of an operating system depending on the level of virtualisation. For example, where full virtualisation is used, unmodified operating systems such as standard windows or other unmodified operating systems may be used. In this full virtualisation embodiment the operating system is not aware that it is sharing hardware. Whereas where paravirtualisation is used operating systems must be modified and the virtual machine recognises that it is sharing hardware resources. A VMM may support a combination of fully virtualised and paravirtualised virtual machines.

Each virtual machine 730, 740 can be referred to as a domain. Within each domain 730, 740 the operating system manages its own applications. Managing the applications within an OS includes responsibility for scheduling each application 750, 760 within time allotted to the virtual machine 730, 740 by the VMM 720. For example, each operating system schedules the execution of its applications as if it were operating on its own stand alone hardware. The VMM allocates processing capacity to the respective virtual machines and schedules the execution from each virtual machine on the physical hardware.

The VMM can also include a mechanism for enabling data to be exchanged between processes executing in different virtual machines, for example using an inter domain signalling protocol. For example, this inter-domain data exchange enables data, such as game outcome data, to be transferred from an operating system executing component processes for game play to an operating system executing component processes for game outcome presentation.

The VMM can also be adapted to selectively enable access to peripheral hardware devices. For example, by virtualising hardware devices 770 or their drivers 780, 782, 784 in a virtual machine, the peripheral hardware devices become accessible to that virtual machine. The VMM may selectively virtualise peripheral devices in a virtual machine, thus only making some peripheral devices accessible to the operating system of the virtual machine. For example, in a gaming system peripheral devices for handling player credits, such as a card reader, can be made accessible only to one operating system and invisible to others, which can have security advantages. Further, each virtual machine can use a different operating system, enabling advantageous operating system and hardware combinations to be chosen. For example, the virtual machine executing a windows operating system having enhanced graphics handling capabilities may be granted direct hardware access to the graphics card.

In the embodiment illustrated in FIG. 7 the applications executed in each operating system 730, 740 are the component processes 750, 760 for implementing the game. The two sets of component processes 750, 760 cooperate to implement the game. For example, the first set of component processes 750 can be processes related to processing game play instructions and generation of game outcomes. The second set of component processes 760 can be game presentation processes, for example game graphics, sounds and controlling other aspects of a game machine such as flashing lights. In this example, game result data generated by the first set of component processes 750 is provided to the second set of component processes 760 for presentation to the player. As these component processes operate in different virtual machines, the game presentation processes do not influence the result of the game. This can offer security advantages and flexibility in game generation.

An example of a suitable VMM for implementing the described architecture is a Xen® hypervisor. Xen® is an open source VMM adapted for use with processor hardware provided from several manufacturers, for example the Xen® hypervisor is adapted for use with IA-32, x86, x86-64, IA-64 and PowerPC 970 architectures. Xen® can support a number of different guest operating systems including Windows®, Linux®, Solaris®, and various versions of the BSD operating system. Xen® is also adapted to take advantage of some hardware virtualisation support in processors manufactured by Intel® and AMD® which enables the hypervisor to grant direct hardware access to guest operating systems. Although a preferred embodiment will now be described with reference to features of the Xen® hypervisor, alternative VMMs are considered within the scope of the present application.

In the Xen® architecture the first virtual machine, domain 0 can have special management privileges for interaction with other virtual machines and special hardware access privileges. The domain 0 operating system instance is booted initially on power up. Typically the operating system for domain 0 is a modified version of Linux. Domain 0 includes management and control functions for building other virtual machines. For example, after the operating system instance of domain 0 is booted further operating system instances can be booted as guest domains from within domain 0 using the management and control functions. For example, a windows operating system may be booted in a guest domain and a further guest domain for a further Linux operating system instance. Each guest domain can be referred to as a domain U or unprivileged domain.

The management and control functions of domain 0 can also be used to selectively allocate access to physical hardware resources to guest operating system instances and the hardware access can be exclusive. For example, hardware access can be allocated to a domain at PCI (peripheral component interconnect) level in a manner which makes the hardware visible and accessible to the allocated domain only, say a guest domain U with a windows operating system instance, and invisible to the other domains including the host domain 0.

Domain 0 can also perform administrative tasks such as suspending and resuming other virtual machines. For example, where there is a fault or crash in a guest domain, the guest operating system instance may be restarted under the control of domain 0 while processing continues in other domains. An advantage of this is that where an operating system is less stable or the code execution in a virtual machine is potentially unstable, this operating system instance can be re-booted independent of processing occurring in other virtual machines, if necessary. For example, in a gaming context graphics processes may execute in one domain and game play processes such as result generation and award handling may execute in another domain. If there is a problem with the graphics processing, then the operating system of the graphics domain may be restarted without disturbing the game play processing. This means that where a problem occurs with graphics processing this can be corrected and allow the game to continue uninterrupted. Depending on the time taken to correct the graphics processing fault a player may not even be aware a problem occurred. Further, risks due to a graphics package or operating system being potentially unstable are mitigated by virtue of the partitioning into separate virtual machines.

Figure 8:
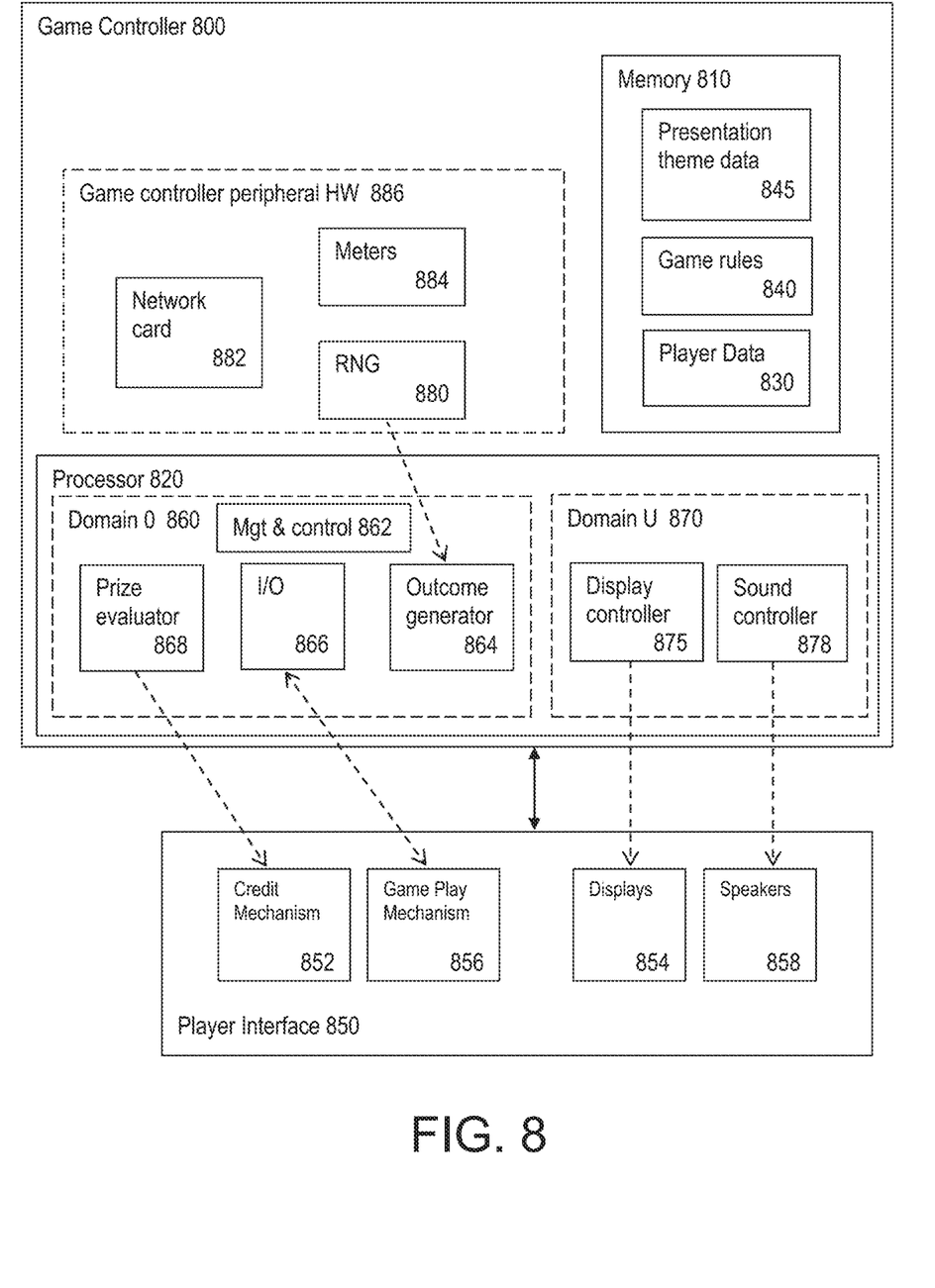
FIG. 8 is a further block diagram of a gaming system.

FIG. 8 illustrates a game system having an electronic processing arrangement adapted to support simultaneous execution of two or more operating system instances. The system includes a game controller 800 and a player interface 850. The game controller includes memory 810, processor 820, and peripheral hardware 886. The player interface 850 includes all the hardware accessible to the player, including a credit mechanism 852 such as a card/ticket reader or coin mechanism, game play mechanism 856 such as a touch screen or buttons, one or more displays 854 and speakers 858. In a case where a touch screen is included as part of the game play mechanism 856 the touch screen may also be one of the displays 854.

In this embodiment the game controller 850 processor 820 can be an electronic processing arrangement including one or more processors, each having one more processor cores. The processor 820 is adapted to support simultaneous execution of two operating system instances, with a first operating system instance running in domain 0 860 and a second operating system instance running in domain U 870. The first, domain 0, operating system instance 860 includes management and control functions 862 for starting and monitoring the second operating system instance 870. The management and control functions 862 can also be used to control access to peripheral hardware for each operating system 860, 870.

In this embodiment a game is implemented using cooperating component processes including an outcome generator process 864, an input/output handling process 866, a prize evaluator 868, a display controller 875 and a sound controller 878. The component processes are partitioned such that the outcome generator 864, input/output handler 866 and prize evaluator 868 component processes for implementing game play execute using the first operating system instance 860 and the display controller 875 and sound controller 878 component processes for presenting game results execute using the second operating system instance 870.

The memory 810 is shared between the two operating system instances. Memory 810 is used to store data such as game rules 840 accessed by the component processes for game play, in particular for generating and evaluating game outcomes, and game presentation theme data 845 which can be accessed by the game presentation component processes. Other data such as player data 830 may be accessed by both the game play and game presentation component processes. For example, during the course of game play, player data may be updated by the game play component processes with a players current credit balance, bet amount, selected pay lines, win amount etc. This data may be read by game presentation component processes for display. A virtual machine monitor VMM (not shown) is responsible for scheduling processing on the physical hardware and memory access for the two domains 860, 870.

In this example the first virtual machine 860, domain 0, uses a version of the Linux® operating system. The game component processes executed within this operating system instance, in this embodiment, are processes related to game play. These processes can include:
- communication via the network interface to game servers;
- receiving and processing game play instructions input via the game play mechanism;
- interaction with game controller peripheral hardware such as a meters for regulator monitoring and a random number generator, if a peripheral random number generator is used;
- game mathematics such as outcome generation and prize evaluation;
- market functions such as player tracking an loyalty monitoring; and
- handling of player credit, including reading cards or tickets, real time processing of credit input using a coin or bill input acceptor, and controlling pay out of credit using a coin output or ticket output.

In this example the second virtual machine 870, domain U, uses a Windows® operating system. The game component processes executed within this operating system instance, in this embodiment, are processes related to game presentation, including video processing, graphical presentation of game outcomes and graphical user interface (GUI) presentation. Sound processing may also be included in this operating system instance. Partitioning the game component processes in this manner enables latest graphical processing features of the Windows® operating system to be taken advantage of for presenting the game.

Other operating system types and combinations thereof may also be used and are envisaged within the scope of the present application. For example, the graphical processing capabilities of Windows® operating system referred to above may be superseded by an alternative operating system or operating system version. In this instance the system may be upgraded by producing an alternative embodiment using the alternative operating system. The host operating system instance and component processes therein executed to perform the game may remain the same. The second guest operating system instance and the component processes executed therein can be changed to the new operating system or version having improved graphical processing capabilities. In this scenario, as the game execution component processes have not been changed, regulatory approval for the upgraded gaming system may be easier to obtain than for an entirely new gaming system.

Some of the game play processes executing in the first virtual machine 860 require access to peripheral hardware. For example, the game play processes 864, 866, 868 executing in the first virtual machine 860 may require access to the credit mechanism 852, network card 882, random number generator 880, meters 884 and game play mechanism 856. Domain 0, in the Xen® architecture is a privileged domain and therefore, by default, is allocated access to all peripheral hardware. This means that all the peripheral hardware will be visible in domain 0 but not visible or directly accessible to any guest domain U. This has an advantage in that any processing in a guest domain U cannot interact with peripheral hardware it does not have access to. For example, graphics processing in domain U cannot affect any credit input or payed out as the credit mechanism is not visible or accessible to domain U. In some embodiments the processing in domain U 870 may not require any direct hardware access or hardware can be emulated in the domain U virtual machine so it appears to domain U that the operating system has access to the hardware, but any data exchanged between a peripheral hardware device and a process in domain U is actually handled by domain 0.

In some embodiments processor and VMM architectures can support granting direct hardware access to domain U. In such embodiments domain 0 can selectively allocate direct access to hardware to domain U. For example, in the embodiment illustrated, domain U can be granted direct access to graphics or video cards and sound cards at PCI level for game presentation. The virtual machines can be configured so that direct access is selectively allocated for different hardware devices and the access can be exclusive.

For example, domain U 870 can be granted direct access to graphics and sound cards used for game graphic and sound processing by the display controller 875 and sound controller 878 and driving the displays 854 and speakers 858 respectively. Other hardware can remain invisible to domain U, for example there is no need for domain U to access the random number generator 880 or credit mechanism 852 so this hardware is not made visible to domain U 870.

The virtual machines can be configured such that direct hardware access to a device is granted exclusively to a virtual machine. Exclusive access to a hardware device for domain U will make the device visible to the operating system in domain U and invisible to the operating system in domain 0. Using the example above, exclusive access to the video and sound cards to domain U will make these cards visible to processes executing in domain U but invisible and inaccessible to processes executing in domain 0. Granting direct access to hardware to a guest domain 870 can be controlled by the host domain, domain 0 860, using the management and control functionality 862 provided in that domain. Configuring the virtual machines may be performed automatically using program code or under the control of an administrator. For example, when starting up a game machine an administrator may log in to domain 0 820 and, using the management and control functions 862, configure the two or more domains to selectively allocate hardware access to one or more domains.

An example of game processing using the game system of FIG. 8 will now be described in relation to a spinning reel game. The display controller 875 in domain U 870 reads game presentation data from memory, processes the presentation data and presents game information on a display 854, for example a screen including game play instructions and an invitation to play the game. A player uses the credit mechanism 852 to input credit for wagers and the game play mechanism 856 to input game play instructions, for example the number of win lines to play and the amount wagered for each win line. These inputs are processed in domain 0 860 by the I/O interface process 866 and player data 830 stored in memory 810. Data may also be sent to a connected game server using the network card 882, for example player tracking data sent to a player loyalty/marketing server or wager data to a bonus server.

The outcome generator 864 operates in response to the player's operation of game play mechanism 856 to generate a game outcome which will then be evaluated by prize evaluator 868. The first part of forming the game outcome is for a random result to be generated, for example using a random number generator 880 and processing the random result by the outcome generator 864 in accordance with game rules 840.

For example, for a spinning reel game, each spinning reel is simulated using a set of symbols having a defined sequence. The symbol image data for each symbol set can be stored in the presentation data 845. A generated random number is used by the outcome generator 864 to determine for each set of symbols a position in the sequence representative of a stop position for the spinning reel. A selected outcome symbol set can be determined from the stop positions and the number of symbols to be selected from each reel, for example three symbols for each of five reels.

The prize evaluator 868 is provided with selected symbol set which is evaluated in accordance with game rules 840 to determine whether a prize is to be awarded for the game outcome. For example, the prize evaluator compares the selected symbol set with prize winning symbol combinations and prize tables stored in the game rules 840 to determine any prize to award. Data indicating any winning combinations and prize data is then stored in player data.

The stop position data or selected symbol data for each reel and any prize data can be provided to the display controller 875 in domain U for presentation of the game outcome symbol set. For example, the stop position data may be stored in memory 810 and a signal or interrupt, triggered by the outcome generator and handled by the VMM, sent to the display controller and sound controller in domain U to advise that a result is ready for display. The display controller 875 uses the stop position data and symbol image data to cause a set of symbols to be displayed on display 854 at a set of display positions. For example, for each of five sets, the three symbols in sequence after the stop position for that set may be displayed such that symbols are displayed at fifteen display positions on display 854. The display controller may also generate and play an animation of the reels spinning prior to displaying the outcome symbol set. The display controller can also highlight any winning symbol combinations based on the prize data, for example by changing the colour of a winning pay line or flashing symbols of a winning combination. Other data such as a credit value awarded for the outcome and player's remaining credit balance can also be read from player data and displayed. Sounds may also be played by the sound controller based on the outcome, for example sounds representative of the reels spinning may be played in conjunction with the animation of the spinning reels and a selected tune may be played for a winning outcome.

This example illustrates how game presentation processing can be performed independent of game play processing. The display controller and sound controller simply read data from the shared memory in order to present the game outcomes. The presentation game processing may be provided read only memory access or alternatively data passed between domains may only be temporarily stored, for example in buffer or register memory, so the processing in domain U does not directly access player data 830. It should be appreciated that partitioning processing in this manner means that presentation processing in domain U can not influence the game play processing in domain 0.

Although the example illustrated uses two virtual machines, three or more virtual machines may also be used. For example, where a software random number generator or pseudo-random number generator is used for generating game outcomes, this random number generator may be isolated from other game processes in its own domain U. This may be advantages for maintaining the security and integrity of the random number generator or enabling the random number generator to be implemented in an operating system different from other operating systems used for game processing.

Persons skilled in the art will also appreciate that an embodiment could be embodied in program code for adapting a processor to support two or more operating system instances and implement a game as described above. The program code could be supplied in a number of ways, for example on a computer readable medium, such as a disc or a memory (for example, that could replace part of memory 103) or as a data signal (for example, by downloading it from a server).

In some cases hardware access may be shared between domains. For example an I/O interface such as a touch screen may be visible in both domain 0 860 for processing input game play instructions and domain U for presenting game instructions or outcomes. In this example the hardware may be emulated in one of the domains. Alternatively access to the hardware is scheduled between the hardware sharing virtual machines by the VMM.

It will be understood to persons skilled in the art of the invention that many modifications may be made without departing from the spirit and scope of the invention, in particular it will be apparent that certain features of the invention can be combined to form further embodiments.

It is to be understood that, if any prior art publication is referred to herein, such reference does not constitute an admission that the publication forms a part of the common general knowledge in the art, in Australia or any other country.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will be understood that the invention disclosed and defined in this specification extends to all alternative combinations of two or more of the individual features mentioned or evident from the text or drawings. All of these different combinations constitute various alternative aspects of the invention.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive. Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. It will be understood that the invention disclosed and defined in this specification extends to all alternative combinations of two or more of the individual features mentioned or evident from the text or drawings. All of these different combinations constitute various alternative aspects of the invention.

The present invention contemplates methods, systems and program products on any electronic device and/or machine-readable media suitable for accomplishing its operations. Certain embodiments of the present invention may be implemented using an existing computer processor and/or by a special purpose computer processor incorporated for this or another purpose or by a hardwired system, for example.

Embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

What is claimed is:

1. A server system configured to utilize multiple virtual machines to provide an electronic game at a gaming device, the server system comprising:
    at least one memory including a first memory partition and a second memory partition; and
    one or more processors configured to:
        execute a first operating system instance of at least one first virtual machine of the multiple virtual machines, the at least one first virtual machine having a random number generator allocated thereto, the at least one first virtual machine configured to execute game play processes stored in the first memory partition, the game play processes generating game result data of the electronic game using the random number generator; and
        execute a second operating system instance of at least one second virtual machine of the multiple virtual machines, the at least one second virtual machine configured to execute game presentation processes stored in the second memory partition using the game result data generated by the first virtual machine to provide display data used for displaying the electronic game at the gaming device.

2. The server system as claimed in claim 1, wherein the one or more processors further execute a virtual machine monitor, wherein the random number generator is not allocated to the virtual machine monitor.

3. The server system as claimed in claim 2, wherein the virtual machine monitor acts as a host operating system and the first operating system instance and second operating system instance act as guest operating systems, and wherein access to hardware resources is allocated selectively to the guest operating systems under control of the host operating system.

4. The server system as claimed in claim 3, wherein the host operating system is configured to monitor the guest operating systems and selectively restart the guest operating systems, where necessary, when an execution error is detected in the guest operating systems.

5. The server system as claimed in claim 1, wherein each of the first operating system instance and the second operating system instance are selectively provided with direct access to one or more other hardware resources excluding the random number generator.

6. The server system as claimed in claim 5, wherein any hardware resource access provided to an operating system instance is provided to one of the first operating system instance and the second operating system instance.

7. The server system as claimed in claim 1, wherein the first and second operating system instances each execute a different type of operating system.

8. The server system as claimed in claim 7, wherein the first operating system instance is a LINUX operating system or variant thereof.

9. The server system as claimed in claim 8, wherein the second operating system instance is a Microsoft Windows operating system.

10. A method for providing an electronic game to at a gaming device using multiple virtual machines, the method performed by a server system including one or more processors and at least one memory including a first memory partition and a second memory partition, the method comprising:
    executing a first operating system instance at one or more first virtual machines of the multiple virtual machines, the one or more first virtual machines configured to execute game play processes stored in the first memory partition, the game play processes generating game results of the electronic game using a random number generator; and
    executing a second operating system instance at one or more second virtual machines of the multiple virtual machines, the one or more second virtual machines configured to execute game presentation processes stored in the second memory partition using the game results generated by the first virtual machine to provide display data used for displaying the electronic game at the gaming device.

11. The method as claimed in claim 10, further comprising executing a virtual machine monitor, wherein the random number generator is not allocated to the virtual machine monitor.

12. The method as claimed in claim 11, wherein the virtual machine monitor acts as a host operating system and the first operating system instance and second operating system instance act as guest operating systems, and wherein access to hardware resources is allocated selectively to the guest operating systems under control of the host operating system.

13. The method as claimed in claim 12, wherein the host operating system is configured to monitor the guest operating systems and selectively restart the guest operating systems, where necessary, when an execution error is detected in the guest operating systems.

14. The method as claimed in claim 10, further comprising selectively providing each of the first operating system instance and the second operating system instance with direct access to one or more other hardware resources excluding the random number generator.

15. The method as claimed in claim 14, wherein any hardware resource access provided to an operating system instance is provided to one of the first operating system instance and the second operating system instance.

16. The method as claimed in claim 10, wherein the first and second operating system instances each execute a different type of operating system.

17. The method as claimed in claim 16, wherein the first operating system instance is a LINUX operating system or variant thereof.

18. The method as claimed in claim 17, wherein the second operating system instance is a Microsoft Windows operating system.

19. At least one non-transitory computer-readable storage media having computer-executable instructions embodied thereon for providing an electronic game to at a gaming device using multiple virtual machines, wherein when executed by a server system including one or more processors and at least one memory including a first memory partition and a second memory partition, the computer-executable instructions cause the one or more processors to:

executing a first operating system instance of at least one first virtual machine of the multiple virtual machines, the at least one first virtual machine configured to execute game play processes stored in the first memory partition, the game play processes generating game results of the electronic game using a random number generator; and executing a second operating system instance of at least one second virtual machine of the multiple virtual machines, the at least one second virtual machine configured to execute game presentation processes stored in the second memory partition using the game results generated by the first virtual machine to provide display data used for displaying the electronic game at the gaming device.

20. The at least one non-transitory computer-readable storage media as claimed in claim 19, wherein the computer-executable instructions further cause the one or more processors to execute a virtual machine monitor, wherein the random number generator is not allocated to the virtual machine monitor.

* * * * *